United States Patent [19]

Tokue

[11] Patent Number: 5,363,232
[45] Date of Patent: Nov. 8, 1994

[54] DEVICE FOR CONTROLLING LUMINOUS ENERGY

[75] Inventor: Yutaka Tokue, Tokyo, Japan

[73] Assignee: Imagica, Corp., Osaka, Japan

[21] Appl. No.: 113,342

[22] Filed: Aug. 30, 1993

[30] Foreign Application Priority Data

Apr. 28, 1993 [JP] Japan .................................. 5-102287

[51] Int. Cl.$^5$ ............................................. G02B 26/02
[52] U.S. Cl. ...................................... 359/234; 359/201;
359/204; 359/226; 348/203; 250/230
[58] Field of Search ............................. 359/196–199,
359/201, 203–204, 212–214, 220–221, 223, 226,
227, 230, 234, 599; 250/234–235, 228–229, 230;
356/445–446, 236; 348/203, 368; 358/474;
346/109, 160; 362/347, 350

[56] References Cited

U.S. PATENT DOCUMENTS

| | | | |
|---|---|---|---|
| 4,932,779 | 6/1990 | Keane | 356/446 |
| 5,044,730 | 9/1991 | Laduke et al. | |
| 5,068,739 | 11/1991 | Filo | 358/237 |
| 5,155,596 | 10/1992 | Kurtz et al. | |

FOREIGN PATENT DOCUMENTS

| | | |
|---|---|---|
| 2-083513 | 3/1990 | Japan . |
| 3-116602 | 5/1991 | Japan . |
| 3-212611 | 9/1991 | Japan . |

*Primary Examiner*—Loha Ben
*Assistant Examiner*—James Phan
*Attorney, Agent, or Firm*—Oblon, Spivak, McClelland, Maier & Neustadt

[57] ABSTRACT

A spherical integrator has beam input and output apertures. The output aperture is opened at a position to which incident beam does not directly strike. The integrator has a curved inner surface which is a uniform diffusion surface. A galvanometer scanner has a mirror capable of adjusting a reflection angle of the beam from a light source such that a luminous energy beam reflected by the mirror to the input aperture is quantitatively varied. Beam from the light source is reflected by the mirror of the scanner to the input aperture of the integrator which diffuses and integrates the incident beam and outputs it through the output aperture.

2 Claims, 2 Drawing Sheets

DEVICE FOR CONTROLLING LUMINOUS ENERGY

BACKGROUND OF THE INVENTION

The present invention relates to a device for controlling luminous energy used for example in a movie film printer or a telecine.

Known as device of this type are a device for varying an area of an aperture by a mechanical stop interposed between a light source and an object, a device for electrically controlling luminous energy from a light source, a device with an optical modulator capable of electrically varying transmissivity and a device for directing beam to any of filters each having a different transmissivity.

When color tune is to be also adjusted upon control of luminous energy, there have been used a device (utilizing so-called subtractive process) with color filters to vary color tone; or a device (using so-called additive process) in which spectroscope means such as color filter, dichroic mirror, diffraction grating or prism separates light into a plurality of lights with monochromatic colors (in general, primary colors: red, green and blue), each of the color lights is controlled with respect to luminous energy by the above-mentioned luminous energy controlling device and such color lights controlled with respect to luminous energy are mixed again.

In the conventional devices for controlling luminous energy, generally the luminous energy is detected by an optical sensor disposed adjacent to an object.

In the device for varying the area of the aperture by the mechanical stop interposed between the light source and the object, when the area of the aperture is varied over a wide range, response for aperture control is slow due to inertia of the mechanical stop. When the area of the aperture is varied over a small range, control with a high degree of precision cannot be ensured.

In the device for electrically controlling luminous energy from the light source, color tone inevitably varies depending upon the luminous energy and concurrently temperature variation of the light source occurs so that stabilized control cannot be ensured.

In the device with the optical modulator capable of electrically varying transmissivity, loss of light is so high that the device is hardly usable in a movie film printer, a telecine or the like.

The device for directing beam to any of filters each having a different transmissivity is also hardly usable in a movie film printer, a telecine or the like, though it may be applicable to control of luminous energy of fine beam entering into and emitting from for example an optical fiber.

Furthermore, in the device for adjusting color tone by the color filters, whenever color tone is to be varied, the color filter used must be replaced by a suitable color filter corresponding to the color tone to be obtained. As a result, it is difficult to vary color tone within an extremely limited time period.

In the device in which light is separated by spectroscope means into a plurality of monochromatic color lights, each color light being controlled with respect to luminous energy by the luminous energy controlling device, the color lights controlled with respect to luminous energy being mixed again, rays of light with different wavelengths pass different paths so that outgoing beam is affected by partial differences of reflection, transmission and dispersion characteristics between the paths and consequently color distortions may be developed.

In view of the above, the present invention has for its object to provide a device for controlling luminous energy which is fast in response and has a higher degree of control accuracy and which can stably attain an outgoing beam with uniform luminous energy distribution over cross section of the beam and with desired intensity and to provides a device for controlling luminous energy which can also adjust color tone without causing color distortions.

BRIEF SUMMARY OF THE INVENTION

The present invention is directed to a device for controlling luminous energy comprising a spherical integrator with beam input and output apertures, the output aperture being opened at a position to which incident beam does not directly strike, the integrator having a curved inner surface which is a uniform diffusion surface, and a galvanometer scanner with a mirror capable of adjusting a reflection angle of the beam from a light source such that the luminous energy of the beam reflected by the mirror to the input aperture is quantitatively varied.

The device for controlling luminous energy may have a plurality of galvanometer scanners to direct to the input aperture a plurality of beams each of which is within a different wavelength range.

According to the present invention, therefore, a beam from the light source is reflected by the mirror of the galvanometer scanner and is directed through the input aperture into the spherical integrator where the incident beam is diffused and integrated, so that the luminous energy on portions of the curved inner surface where the incident beam does not directly strike is not dependent on a direction of the incident beam but only dependent on the luminous energy of the incident beam. Therefore, by changing the direction of the incident beam by the galvanometer scanner to quantitatively vary the luminous energy of the beam directed through the input aperture, outgoing beam with uniform luminous energy distribution over cross section of the beam and with desired intensity is outputted through the output aperture.

When a plurality of beams from the light source each of which is within a different wavelength range are directed through the input aperture into the integrator by a plurality of galvanometer scanners and luminous energy of each incident beam is quantitatively varied independently of each other, outgoing beam is obtained which is uniform in luminous energy distribution over the cross section of the beam and has a desired intensity and concurrently color tone adjustment is carried out.

The present invention will become more apparent from the following description of preferred embodiments thereof taken in conjunction with the accompanying drawings.

BRIEF DESCRIPTION OF THE DRAWINGS

The same reference numerals are used to designate similar parts throughout the figures.

DETAILED DESCRIPTION OF THE PREFERRED EMBODIMENTS

Figure 1:
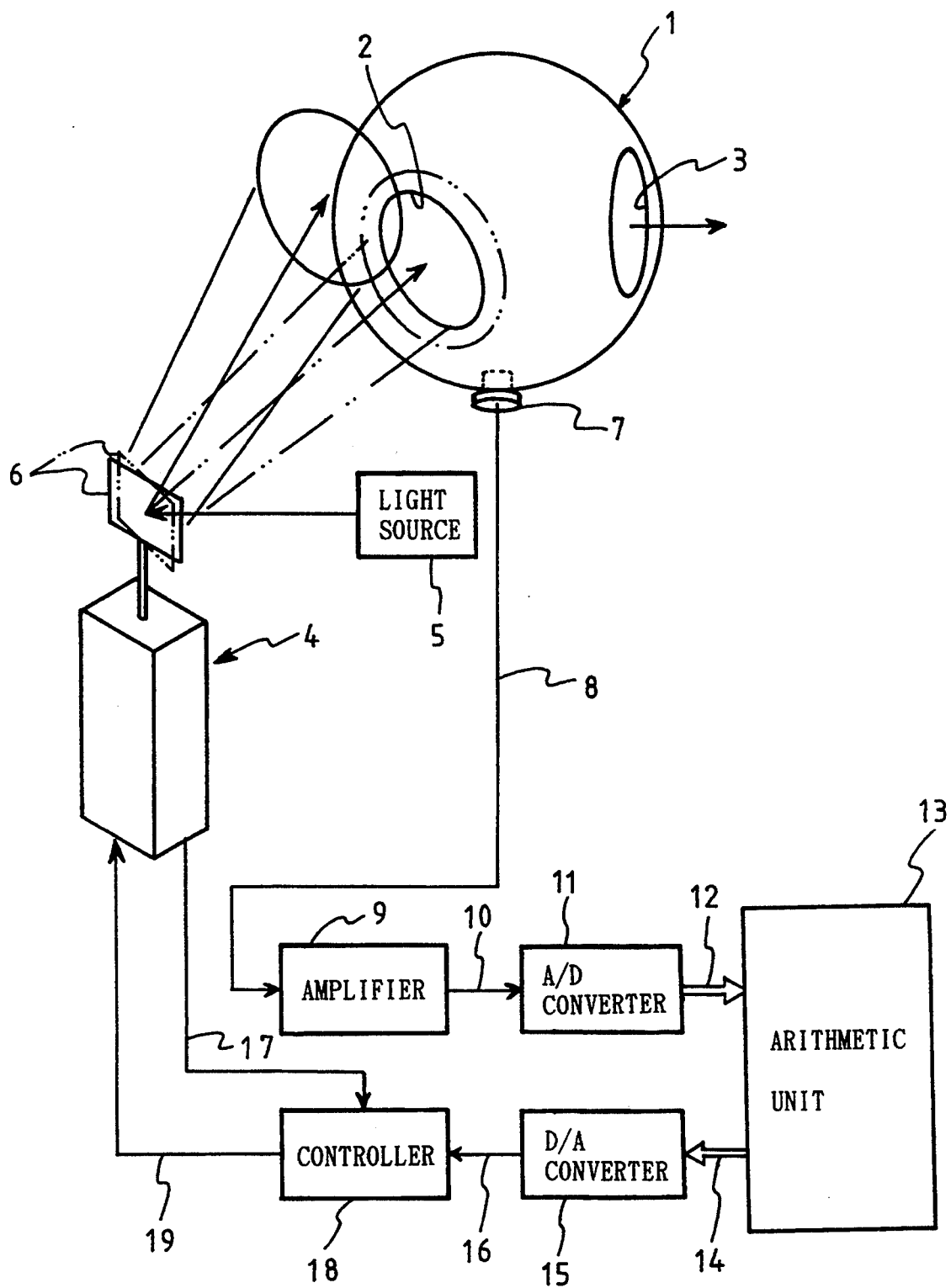
FIGS. 1 and 2 are schematic views illustrating first and second embodiments of the present invention, respectively.

FIG. 1 shows a first embodiment of the present invention. Reference numeral 1 designates a spherical integrator with beam input and output aperture 2 and 3, said output aperture being opened at a position to which incident beam does not directly strike, said integrator 1 having a curved inner surface coated with a white diffusion-reflection paint such as barium sulfate or magnesium oxide so that the curved inner surface becomes a non-selective and uniform diffusion surface for beams of every wavelength. Reference numeral 4 denotes a galvanometer scanner with a mirror 6 capable of changing the reflection angle of a beam from a light source 5 so that the luminous energy of the beam directed to the inlet aperture 2 can be quantitatively varied.

In this embodiment, the light source 5 includes a filter capable of passing only visible light and a condenser lens for converging rays of light passing through the filter into a converged beam; but it is to be understood that convergence of the rays of light from the light source 5 is not requirement.

A photosensor 7 such as photodiode is attached to the integrator 1 at a position to which incident beam does not directly strike like the output aperture 3. The integrator 1 further includes an amplifier 9 which converts an detection current signal 8 derived from the photosensor 7 and representative of luminous energy (illumination intensity) into a voltage signal and amplifies the same, an A/D converter 11 which converts the analog, voltage signal 10 derived from the amplifier 9 to a digital signal 12, an arithmetic unit 13 which compares the digital signal 12 with a predetermined value and outputs a mirror control signal 14 which is obtained from the result of the above-mentioned comparison and which controls the mirror 6 of the scanner 4, a D/A converter 15 which converts the digital, control signal 14 derived from the arithmetic unit 13 into an analog signal 16 and a controller 18 which delivers a mirror-position control signal 19 to the scanner 4 in response to the analog signal 16 from the D/A converter 15 and a mirror-position signal 17 from the scanner 4.

Next the mode of operation of the first embodiment with the above-mentioned construction will be described.

The beam from the light source 5 is reflected by the mirror 6 of the galvanometer scanner 4 through the input aperture 2 to the spherical integrator 1. Within the integrator 1, the incident beam is diffused and integrated and is outputted through the output aperture 3.

In this case, the luminous energy of the beam directed into the integrator 1 is detected by the photosensor 7 and is converted into the current signal 8 which in turn is delivered to the amplifier 9.

The current or detection signal 8 is then converted into the amplified voltage signal 10 by the amplifier 9 and delivered to the A/D converter 11 which converts the analog, voltage signal 10 into the digital signal 12 which in turn is delivered to the arithmetic unit 13.

The digital signal 12 delivered to the unit 13 is compared with a predetermined value by the unit 13 and a comparison result is delivered as the mirror control signal 14 to the D/A converter 15 where the control signal 14 is converted into the analog signal 16 which in turn is delivered to the controller 18.

The controller 18 also receives the mirror-position signal 17 from the galvanometer scanner 4 and delivers the mirror-position control signal 19 to the scanner 4 in response to both the analog signal 16 and the mirror-position signal 17. Therefore, in response to the control signal 19, the angle of the mirror 6 is controlled and the direction of the beam from the light source 5 and reflected by the mirror 6 is controlled and thus the luminous energy of the incident beam introduced through the mirror into the input aperture 2 of the integrator 1 is controlled. As a result, the luminous energy of the outgoing beam through the output aperture 3 is controlled to a predetermined level.

The galvanometer scanner 4 is extremely fast in response and has an extremely high degree of control accuracy.

The beam introduced into the spherical integrator 1 is diffused and integrated therein, so that the luminous energy on portions of the curved inner surface of the integrator 1 where the incident beam does not directly strike is not dependent on a direction of the incident beam but only dependent on the luminous energy of the incident beam. Therefore, as described above, when the direction of reflection of the beam is changed by the galvanometer scanner 4 to quantitatively vary the luminous energy directed to the input aperture 2 of the integrator 1, outgoing beam can be obtained which is uniform in luminous energy distribution over the cross section of the beam and which has a desired intensity. Furthermore, the luminous energy detected by the photosensor 7 disposed at the position to which no incident beam strikes is the luminous energy itself outputted through the output aperture 3. As a result, as compared with any conventional luminous-energy controlling device with a photosensor adjacent to an object, measurement accuracy of the luminous energy is considerably improved so that any variation of luminous energy with age from an illuminant in the light source can be accurately complied with.

Thus, while response and control accuracy are considerably improved, outgoing beam can be stably obtained which is uniform in luminous energy distribution over the cross section of the beam and which has a desired intensity.

Figure 2:
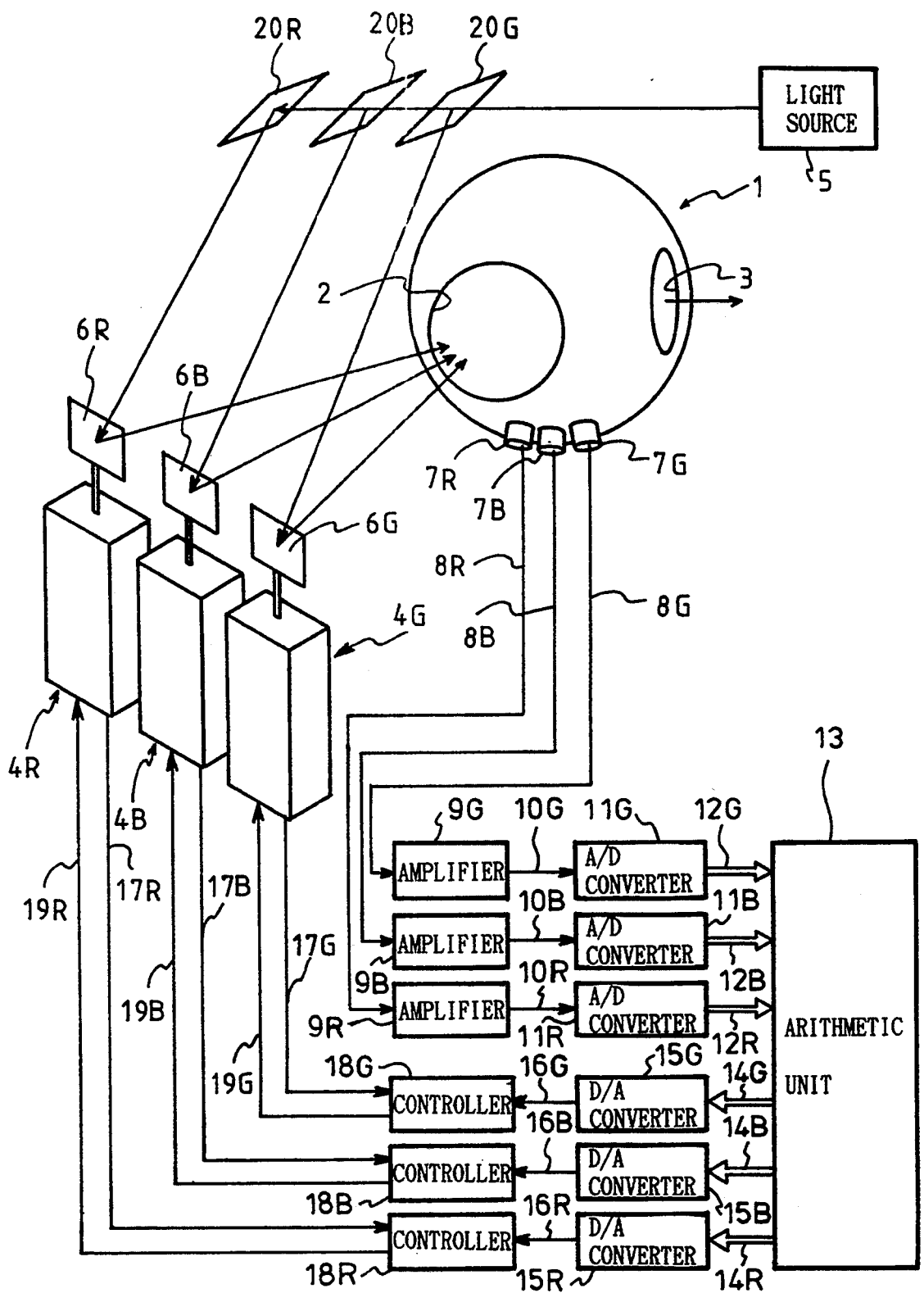

FIG. 2 shows a second embodiment of the present invention which is substantially similar in construction to that of the first embodiment except that a plurality of galvanometer scanners 4R, 4G and 4B are arranged to separately introduce a plurality of beams from the light source 5 to the input aperture 2 of the spherical integrator 1 each of which is within a different wavelength range.

In FIG. 2, reference numerals 20R, 20B and 20G denote dichroic mirrors which separate light from the light source 5 into lights with monochromatic colors (three primary colors of red, blue and green) each within a different wavelength range; 6R, 6G and 6B, mirrors of the galvanometer scanners 4R, 4G and 4B, respectively, which can be controlled in angle and which reflect beams projected from the light source 5 through the dichromatic mirrors 20R, 20G and 20B, respectively; 7R, 7G and 7B, photosensors such as photodiode which are attached to the integrator 1 at positions to which incident beam through the input aperture 2 of the integrator 1 does not directly strike and which are respectively provided with color filters corresponding to the different wavelength ranges of the red, green and blue color components; 9R, 9G and 9B, amplifiers which respectively convert detection current signals 8R, 8G and 8B derived from the photosensors 7R, 7G and 7B and representative of luminous energies (illumination intensities) into voltage signals and amplifies the same; 11R, 11G and 11B, A/D converters which respectively convert the analog, voltage signals 10R, 10G and 10B derived from the amplifiers 9R, 9G and 9B to digital signals 12R, 12G and 12B; 13, an arithmetic unit which compares the digital signals 12R, 12G and 12B with predetermined values, respectively, and outputs mirror control signals 14R, 14G and 14B which are respectively obtained from the results of the above-mentioned comparison and which respectively control the mirrors 6R, 6G and 6B of the scanners 4R, 4G and 4B; 15R, 15G and 15B, D/A converters which respectively convert the digital, control signals 14R, 14G and 14B derived from the arithmetic unit 13 into analog signals 16R, 16G and 16B; and 18R, 18G and 18B, controllers which respectively deliver mirror-position control signals 19R, 19G and 19B to the scanners 4R, 4G and 4B in response to the analog signals 16R, 16G and 16B from the D/A converters 15R, 15G and 15B and mirror-position signals 17R, 17G and 17B from the scanners 4R, 4G and 4B.

In the second embodiment shown in FIG. 2, the beam from the light source 5 is separated by the dichroic mirrors 20R, 20G and 20B into beams of three primary colors which are respectively reflected by the mirrors 6R, 6G and 6B of the scanners 4R, 4G and 4B through the input aperture 2 to the spherical integrator 1. Within the integrator 1, the incident beams are diffused and integrated and outgoing beam is outputted through the output aperture 3.

In this case, the luminous energies of the beams directed into the integrator 1 are respectively detected by the photosensors 7R, 7G and 7B and are converted into the current signals 8R, 8G and 8B which in turn are delivered to the amplifiers 9R, 9G and 9B.

The current or detection signals 8R, 8G and 8B are then respectively converted into the amplified voltage signals 10R, 10G and 10B by the amplifiers 9R, 9G and 9B and delivered to the A/D converters 11R, 11G and 11B which respectively convert the analog, voltage signals 10R, 10G and 10B into the digital signals 12R, 12G and 12B which in turn are delivered to the arithmetic unit 13.

The digital signals 12R, 12G and 12B delivered to the unit 13 is compared with the predetermined values by the unit 13 and comparison results are delivered as the mirror control signals 14R, 14G and 14B to the D/A converters 15R, 15G and 15B where the control signals 14R, 14G and 14B are respectively converted into the analog signals 16R, 16G and 16B which in turn are respectively delivered to the controllers 18R, 18G and 18B.

The controllers 18R, 18G and 18B also respectively receive the mirror-position signals 17R, 17G and 17B from the scanners 4R, 4G and 4B and deliver the mirror-position control signals 19R, 19G and 19B to the scanners 4R, 4G and 4B in response to both the analog signals 16R, 16G and 16B and the mirror-position signals 17R, 17G and 17B. Therefore, in response to the control signals 19R, 19G and 19B, the angles of the mirrors 6R, 6G and 6B are controlled and the direction of the beams from the light source 5 and reflected by the mirrors 6R, 6G and 6B as beams of three primary colors are controlled and thus the luminous energies of the incident beams of three primary colors introduced through the mirrors 6R, 6G and 6B into the input aperture 2 of the integrator 1 are controlled. As a result, the luminous energy of the outgoing beam through the output aperture 3 is controlled to a predetermined level and concurrently color tone is adjusted.

Thus, in the second embodiment shown in FIG. 2, while response and control accuracy are improved, outgoing beam can be stably obtained which is uniform in luminous energy distribution over the cross section of the beam and which has a desired intensity and furthermore color tone can be adjusted without causing color distortions.

It is to be understood that the present invention is not limited to the above-described embodiments and that various modifications may be effected without departing from the true spirit of the present invention.

As described above, a device for controlling luminous energy in accordance with the present invention can improve response and control accuracy and stably obtain outgoing beam which is uniform in luminous energy distribution over the cross section of the beam and which has a desired intensity. Furthermore, when the device is further provided with a plurality of galvanometer scanners which can individually direct a plurality of beams at different wavelengths to the input aperture of the spherical integrator, color tone can be also adjusted without color distortions.

What is claimed is:

1. A device for controlling a luminous energy comprising a spherical integrator with beam input and output apertures, said beam output aperture being opened at a position to which incident beam does not directly strike, said spherical integrator having a curved inner surface which is a uniform diffusion surface, and a galvanometer scanner with a mirror capable of adjusting a reflection angle of a beam from a light source such that the luminous energy of the beam reflected by said mirror to said input aperture is quantitatively varied.

2. A device according to claim 1 wherein a plurality of galvanometer scanners are arranged to direct to said input aperture of the integrator a plurality of beams each of which is within a different wavelength range.

* * * * *